US011785472B2

(12) United States Patent
Singh (10) Patent No.: US 11,785,472 B2
(45) Date of Patent: Oct. 10, 2023

(54) TRANSFER OF SPECTRUM GRANTS DURING INTER-SAS CBSD MIGRATION

(71) Applicant: Charter Communications Operating, LLC, St. Louis, MO (US)

(72) Inventor: Lakhbir Singh, Aurora, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 216 days.

(21) Appl. No.: 17/366,516

(22) Filed: Jul. 2, 2021

(65) Prior Publication Data
US 2023/0007497 A1 Jan. 5, 2023

(51) Int. Cl.
*H04W 16/14* (2009.01)
*H04W 72/0453* (2023.01)
*H04W 72/23* (2023.01)

(52) U.S. Cl.
CPC ....... *H04W 16/14* (2013.01); *H04W 72/0453* (2013.01); *H04W 72/23* (2023.01)

(58) Field of Classification Search
CPC .. H04W 16/14; H04W 72/0453; H04W 72/23
USPC ........................................................ 370/329
See application file for complete search history.

(56) References Cited

U.S. PATENT DOCUMENTS

| 10,368,351 B1* | 7/2019 | Syed ..................... H04W 72/51 |
| 2019/0274052 A1* | 9/2019 | Zhao ................. H04W 28/0205 |
| 2019/0364565 A1* | 11/2019 | Hmimy ................. H04W 36/06 |
| 2020/0245152 A1* | 7/2020 | Guo ...................... H04W 16/14 |
| 2021/0006983 A1* | 1/2021 | Sun ....................... H04W 16/10 |
| 2021/0058796 A1* | 2/2021 | Gandhi ................. H04W 28/16 |
| 2021/0076223 A1* | 3/2021 | Taneja .................. H04W 16/16 |
| 2022/0386132 A1* | 12/2022 | Sevindik ............... H04W 16/12 |
| 2023/0007668 A1* | 1/2023 | Al-Mufti ............. H04W 52/367 |

OTHER PUBLICATIONS

Wireless Innovation Forum (WINNF), "Signaling Protocols and Procedures for CBRS: SAS—CBSD Interface Technical Specification", Document WINNF-TS-0016, Version V1.2.6, Nov. 25, 2020 (60 pages).
Wireless Innovation Forum (WINNF), "Signaling Protocols and Procedures for CBRS: SAS—SAS Interface Technical Specification" Document WINNF-TS-0096, Version V1.3.2, Mar. 11, 2020 (44 pages).

* cited by examiner

*Primary Examiner* — Robert J Lopata
(74) *Attorney, Agent, or Firm* — Mendelsohn Dunleavy, P.C.; Steve Mendelsohn (57) ABSTRACT

In certain embodiments, one or more Citizens Broadband Radio Service (CBRS) service devices (CBSDs) may be migrated from their current Spectrum Access System (SAS) to a new SAS, where at least one existing PAL or GAA spectrum grant is transferred from the current SAS to the new SAS without waiting for a timer associated with the existing spectrum grant to expire. CBSDs may be migrated one at a time or multiple CBSDs of a single service provider may be migrated in a single process where the multiple CBSDs are identified by a shared organization ID associated with the service provider. In either case, a migrating CBSD can continue to use its previously existing spectrum grants after migrating to the new SAS without significant delay.

30 Claims, 9 Drawing Sheets

| TABLE I: GRANT TRANSFER REQUEST / RESPONSE | |
|---|---|
| Message Field | Field Definition |
| CBSD ID | FCC ID and the CBSD serial number assigned by the manufacturer |
| Grants | Contains all active grants for the CBSD and other transmission-related parameters, e.g., maximum transmit power authorized for the CBSD |
| Grant ID | Unique grant ID currently used by the SAS that is used by peer SASs to identify the grant |
| Grant Status | Current status of the grant – active, terminated, or suspended |
| Operational parameters | Detailed grant information, e.g., channel, transmit power, etc. as defined in the WINNF specifications |
| Channel type | PAL or GAA |
| Grant expiry time | Time grant is set to expire in UTC time YYYY-MM-DD hh:mm:ss |

TABLE II. MIGRATION REQUEST

| Message Field | Field Definition |
|---|---|
| SAS ID | SAS originating request |
| Organization ID | Service provider organization ID in the current SAS |
| Request Type | Migration |
| Migration Request ID | Request number for tracking |
| Status | New |

TABLE III. MIGRATION REQUEST RESPONSE

| Message Field | Field Definition |
|---|---|
| SAS ID | SAS sending response |
| Organization ID | Service Provider organization ID in the current SAS |
| Request Type | Migration |
| Migration Request ID | Request number for tracking |
| Status | Approve/Deny |

FIG. 7

TABLE IV. INITIATE MIGRATION

| Message Field | Field Definition |
|---|---|
| SAS ID | SAS sending message |
| Organization ID | Service provider organization ID in the current SAS |
| Request Type | Migration |
| Migration Request ID | Request number for tracking |
| Status | Approved |

TABLE V. FORWARD CBSD REQUESTS

| Message Field | Field Definition |
|---|---|
| SAS ID | SAS sending message |
| Organization ID | Service Provider organization ID in the current SAS |
| Request Type | Proxy Function Activation |
| Migration Request ID | Request number for tracking |
| Status | New Request |

FIG. 7 (cont)

TABLE VI. MIGRATION COMPLETE

| Message Field | Field Definition |
|---|---|
| SAS ID | SAS sending message |
| Organization ID | Service provider organization ID in the current SAS |
| Request Type | Migration |
| Migration Request ID | Request number for tracking |
| Status | Complete or Acknowledged |

FIG. 7 (cont)

TRANSFER OF SPECTRUM GRANTS DURING INTER-SAS CBSD MIGRATION

BACKGROUND

Field of the Disclosure

The present disclosure relates to the wireless communication systems using unlicensed shared spectrum and, more specifically but not exclusively, to the 5G wireless communications systems.

Description of the Related Art

This section introduces aspects that may help facilitate a better understanding of the disclosure. Accordingly, the statements of this section are to be read in this light and are not to be understood as admissions about what is prior art or what is not prior art.

In a shared-spectrum Citizens Broadband Radio Service (CBRS) network, a Spectrum Access System (SAS) is used to allocate radio resources (i.e., one or more portions of the wireless CBRS spectrum) to an associated CBRS service device (CBSD) based on a request from the CBSD, where allocated spectrum grants are in chunks of 10 MHz up to the maximum supported by the CBSD and available to be assigned by SAS. According to the Wireless Innovation Forum (WINNF) "Signaling Protocols and Procedures for CBRS: SAS-CBSD Interface Technical Specification" (Document WINNF-TS-0016, Version V1.2.6, 25 November 2020), the teachings of which are incorporated herein by reference in their entirety, CBRS networks support three different types of spectrum grants, in order of highest to lowest priority: Incumbent licenses, Priority Access licenses (PALs), and General Authorized Access (GAA) licenses.

After a SAS allocates a spectrum grant to a CBSD under a GAA license, the CBSD transmits periodic heartbeat messages to the SAS to inform the SAS that the CBSD is still using that spectrum grant, and the SAS responds to each heartbeat message by transmitting a heartbeat acknowledgment message back to the CBSD. The SAS maintains a separate week-long timer for each GAA spectrum grant allocated to one of its associated CBSDs. When the SAS receives a heartbeat message from a CBSD for a particular GAA spectrum grant, the SAS re-sets the corresponding timer. If and when the SAS fails to receive a heartbeat message for a particular GAA spectrum grant for a week, the corresponding timer will expire and the SAS will de-allocate that spectrum grant from that CBSD.

A CBRS network may have multiple SASs, where each SAS is associated with a different set of one or more CBSDs. According to the WINNF "Signaling Protocols and Procedures for CBRS: SAS-SAS Interface Technical Specification" (Document WINNF-TS-0096, Version V1.3.2, 11 March 2020), the teachings of which are incorporated herein by reference in their entirety, the multiple SASs perform a nightly inter-SAS CPAS (Coordinated Periodic Activity among SASs) procedure, during which each SAS shares its current set of spectrum grants with each other SAS such that each SAS maintains a local database of all of the different spectrum grants for all of the SASs in order to coordinate its future spectrum grants to avoid wireless interference between different CBSDs associated with different SASs.

SUMMARY

For business or other possible reasons, a service provider operating a set of CBSDs may decide to migrate one or more or even all of its CBSDs from being associated with a current SAS to being associated with a different SAS. In order to migrate a CBSD from its current SAS to a different SAS, the SAS Uniform Resource Locator (URL) stored at the CBSD is updated to point the CBSD to the new SAS. If the CBSD had been operating on a GAA channel allocated by the old SAS, then the old SAS will keep that GAA spectrum grant allocated for a week after the CBSD has been migrated to the new SAS until the corresponding week-long timer for that existing spectrum grant expires, at which time the old SAS de-allocates the spectrum grant and makes those radio resources available in the common spectrum pool via the inter-SAS CPAS procedure. At that time, the new SAS may be able to allocate that same spectrum to the CBSD that migrated to it a week earlier (assuming that that portion of the CBRS spectrum has not already been allocated to another CBSD by another SAS). As a result, from the time of migration until the following week, the original CBSD will not be able to use that spectrum. This inability to operate on the same spectrum can cause operational issues, especially when the CBRS network is designed to operate on the same frequency with a re-use factor of 1. There is even a possibility that the CBSD migration process may take weeks to execute with a lot of service degradation or disruption.

Problems in the prior art are addressed in accordance with the principles of the present disclosure by providing a technique for a new SAS to request immediate relinquishment of an existing GAA spectrum grant from an old SAS in the case of inter-SAS CBSD migration so that the migrating CBSD does not have to wait a week to be able to use that same spectrum grant. Moreover, the procedure ensures that the spectrum grant is retained by the migrating CBSD instead of being allocated to some other CBSD.

BRIEF DESCRIPTION OF THE DRAWINGS

Embodiments of the disclosure will become more fully apparent from the following detailed description, the appended claims, and the accompanying drawings in which like reference numerals identify similar or identical elements.

DETAILED DESCRIPTION

Detailed illustrative embodiments of the present disclosure are disclosed herein. However, specific structural and functional details disclosed herein are merely representative for purposes of describing example embodiments of the present disclosure. The present disclosure may be embodied in many alternate forms and should not be construed as limited to only the embodiments set forth herein. Further, the terminology used herein is for the purpose of describing particular embodiments only and is not intended to be limiting of example embodiments of the disclosure.

As used herein, the singular forms "a," "an," and "the," are intended to include the plural forms as well, unless the context clearly indicates otherwise. It further will be understood that the terms "comprises," "comprising," "contains," "containing," "includes," and/or "including," specify the presence of stated features, steps, or components, but do not preclude the presence or addition of one or more other features, steps, or components. It also should be noted that in some alternative implementations, the functions/acts noted may occur out of the order noted in the figures. For example, two figures shown in succession may in fact be executed substantially concurrently or may sometimes be executed in the reverse order, depending upon the functions/acts involved.

Figure 1:
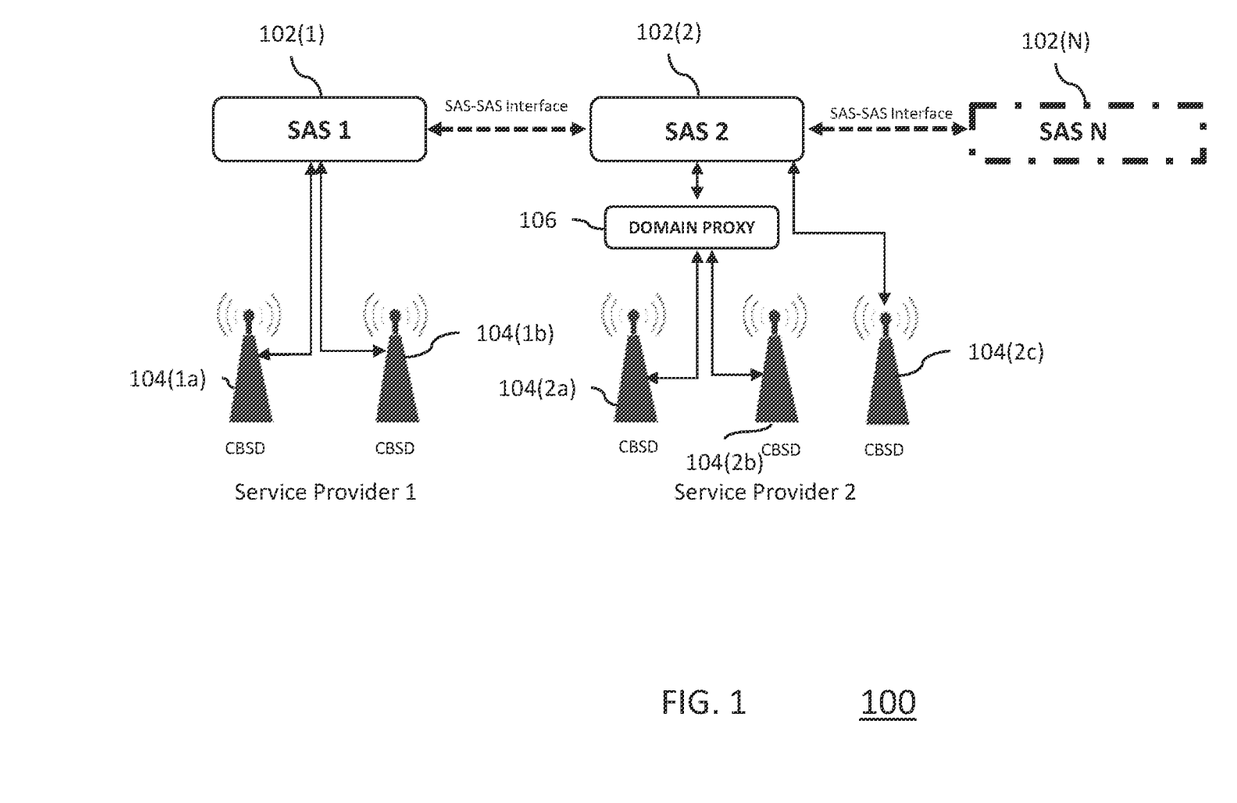
FIG. 1 is a block diagram showing an example communications network.

FIG. 1 is a block diagram showing an example communications network 100 comprising a number of different SASs 102(1)-102(N), each of which is associated with a number of different CBSDs 104, where CBSDs 104(1a) and 104(1b) of a first service provider are associated with a first SAS 102(1) and CBSDs 104(2a)-104(2c) of a second service provider are associated with a second SAS 102(2). Those skilled in the art will understand that additional CBSDs (not shown in FIG. 1) of the same or different service providers may be associated with each of SASs 102(1)-102(N), that each SAS may serve the CBSDs of multiple different service providers, and that each service provider may have CBSDs associated with a single SAS or multiple different SASs as long as each CBSD is associated with only one SAS at a time.

As shown in FIG. 1, CBSDs 104(1a) and 104(1b) communicate directly with SAS 102(1) and CBSD 104(2c) communicates directly with SAS 102(2), while CBSDs 104(2a) and 104(2b) communicate with SAS 102(2) via domain proxy 106, which aggregates communications from multiple CBSDs 104 to the SAS 102(2) and disaggregates communications from the SAS 102(2) to those multiple CBSDs. Those skilled in the art will understand that additional CBSDs 104 (not shown in FIG. 1) may communicate with SAS 102(2) via the domain proxy 106, and that the network 100 may have additional domain proxies (not shown in FIG. 1) that support SAS-CBSD communications between the SASs 102(1)-102(N) and additional CBSDs (not shown in FIG. 1).

Figure 2:
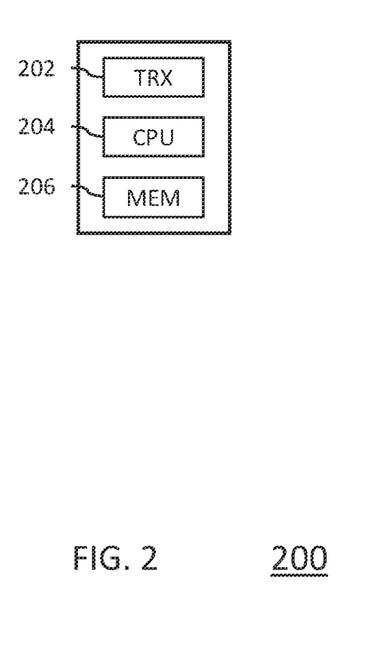
FIG. 2 is a simplified hardware block diagram showing a generic node that may be used to implement each individual SAS, CBSD, and domain proxy in FIG. 1.

FIG. 2 is a simplified hardware block diagram showing a generic node 200 that may be used to implement each individual SAS 102, CBSD 104, and domain proxy 106 in FIG. 1. The generic node 200 comprises communication hardware (e.g., at least one wireless and/or wireline transceiver (TRX)) 202 that supports communications with other nodes, a processor (e.g., a CPU microprocessor) 204 that controls the operations of the node 200, and a memory 206 (e.g., RAM and/or ROM) that stores code executed by the processor 204 and/or data generated and/or received by the node 200. Those skilled in the art will understand how to individually implement instances of the generic node 200 to provide the specific functionalities associated with the SASs 102, CBSDs 104, and domain proxies 106 in FIG. 1, as appropriate.

Figure 3:
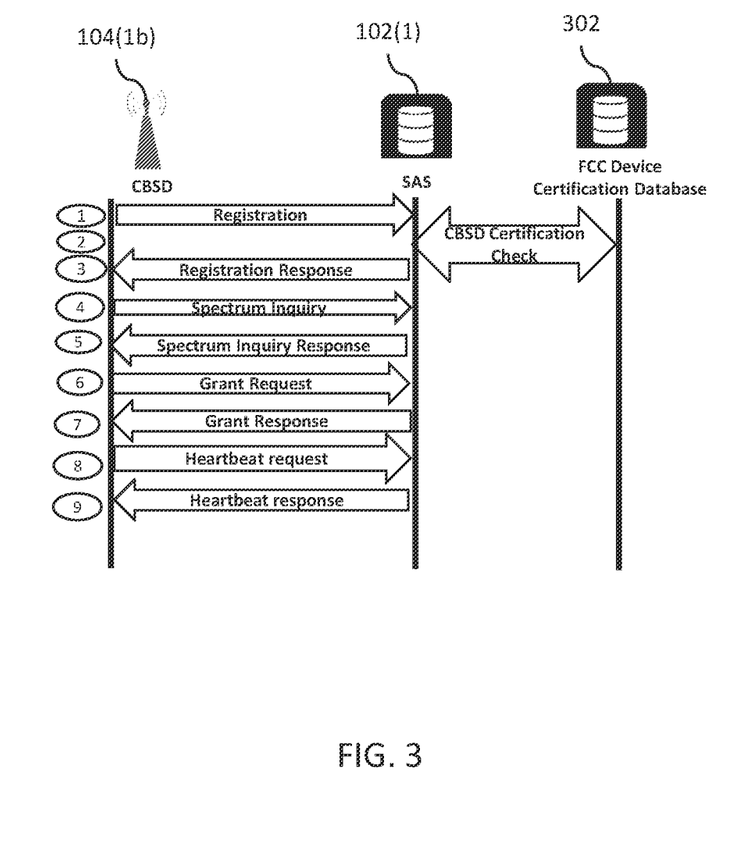
FIG. 3 is a signal flow diagram that represents the processing involved in a CBSD registering and requesting allocation of a spectrum grant from a SAS.

FIG. 3 is a signal flow diagram that represents the processing involved in a CBSD registering and requesting allocation of a spectrum grant from a SAS. For example, the processing of FIG. 3 could apply to the CBSD 104(1b) of FIG. 1 registering and requesting a spectrum grant from the SAS 102(1). Note that this diagram corresponds to a CBSD that communicates directly with a SAS. Those skilled in the art will understand how the signal flow would be modified for a CBSD, such as CBSD 104(2a), that communicates with a SAS, such as SAS 102(2), via a domain proxy, such as domain proxy 106 of FIG. 1.

The processing of FIG. 3 begins with Step 1 in which the CBSD 104(1b) sends a registration request to the SAS 102(1). In response, in Step 2, the SAS accesses the FCC Device Certification Database 302 to confirm the certification status of the CBSD. Assuming that the CBSD is properly authenticated in Step 2, in Step 3, the SAS sends a positive registration response to the CBSD.

In Step 4, the CBSD 104(1b) sends a spectrum inquiry request to the SAS 102(1) to check for available spectrum. In response, in Step 5, the SAS accesses its local database to determine what portions of the CBRS spectrum are currently available and sends a response to the CBSD with that information.

In Step 6, the CBSD 104(1b) analyzes the available CBRS spectrum portions and sends a grant request to the SAS 102(1) for at least some of that available spectrum. In response, in Step 7, the SAS sends a grant response to the CBSD indicating which part(s) of the requested spectrum portions have been granted and updates its local CPAS database accordingly.

In Step 8, when the CBSD 104(1b) is ready to use the granted spectrum, the CBSD sends a heartbeat message to the SAS 102(1) indicating that the CBSD is ready to use the granted spectrum. In response, in Step 9, the SAS sends a heartbeat response to the CBSD indicating that the CBSD is authorized to use the granted spectrum. Although not represented in FIG. 3, the CBSD 104(1b) begins to use the granted spectrum (for wireless communications with wireless devices (not shown in the figures) within its geographical coverage area) and periodically transmits additional heartbeat messages to inform the SAS 102(1) that the CBSD is continuing to use the granted spectrum.

Figure 4:
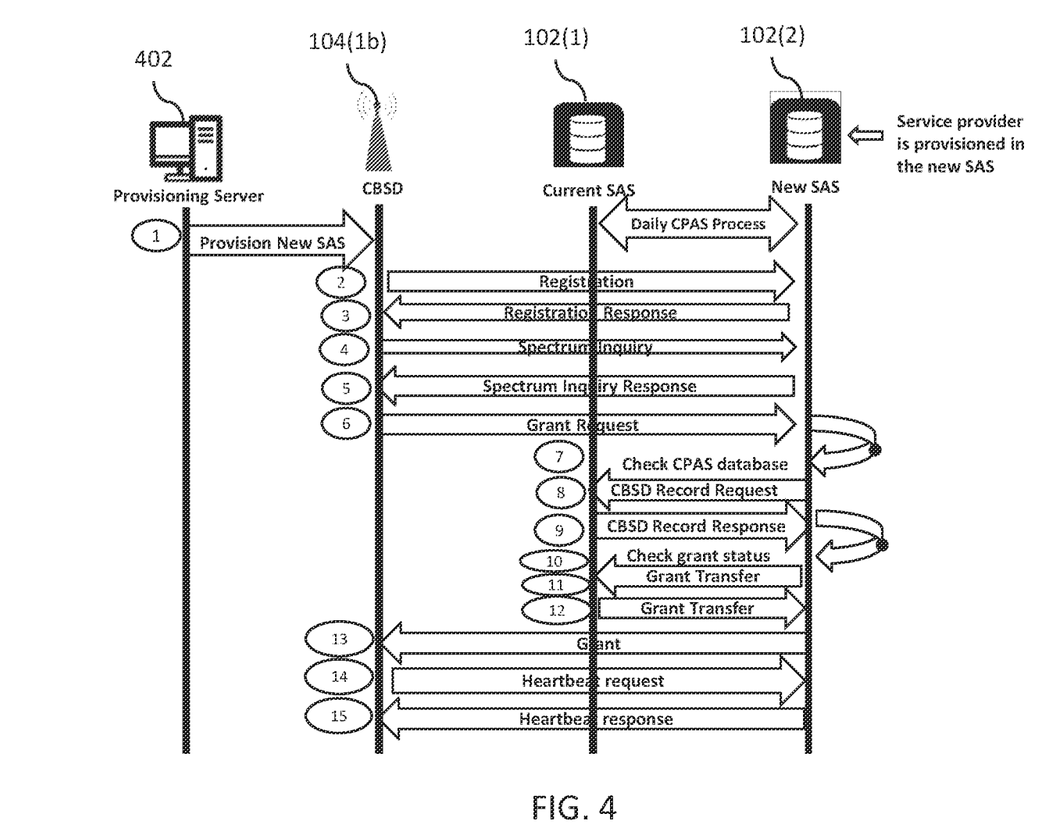
FIG. 4 is a signal flow diagram that represents the processing involved in a service provider migrating one of its CBSDs from a current SAS to a new SAS.

FIG. 4 is a signal flow diagram that represents the processing involved in a service provider migrating one of its CBSDs from a current SAS to a new SAS. For example, the processing of FIG. 4 could apply to the CBSD 104(1b) of FIG. 1 migrating from being associated with the (current) SAS 102(1) to being associated with the (new) SAS 102(2). Note that this diagram corresponds to a CBSD that communicates directly with each SAS. Those skilled in the art will understand how the signal flow would be modified for a CBSD that communicates with a SAS via a domain proxy.

The assumption in FIG. 4 is that the CBSD 104(1b) has already registered with and received one or more spectrum grants from the current SAS 102(1) using the processing of FIG. 3, at least one of which spectrum grants is a GAA spectrum grant, and that the service provider for the CBSD has decided to migrate the CBSD from being associated with the current SAS 102(1) to the new SAS 102(2). Furthermore, it is also assumed that, prior to the processing of FIG. 4, the current SAS and the new SAS have participated in the daily inter-SAS CPAS procedure such that each SAS has a local CPAS database identifying the current set of spectrum grants throughout the network 100 of FIG. 1.

The processing of FIG. 4 starts in Step 1 with the provisioning server 402 of the service provider of the migrating CBSD 104(1b) sending an instruction to the CBSD to update its CBSD configuration file to replace the URL of the current SAS 102(1) with the URL of the new SAS 102(2).

In Step 2, the CBSD 104(1b) uses the new SAS's URL to send a registration request to the new SAS 102(2). In response, in Step 3, the new SAS accesses the FCC Device Certification Database (not shown in FIG. 4) to authenticate the CBSD and then sends a positive registration response to the CBSD. Note that the messaging used in Steps 2 and 3 is the same conventional messaging used in Steps 1 and 3 in the processing of FIG. 3.

In Step 4, the CBSD 104(1b) sends a spectrum inquiry request to the new SAS 102(2) to check for available spectrum. In response, in Step 5, the new SAS accesses its local database to determine what portions of the CBRS spectrum are currently available and sends a response to the CBSD with that information. Note that the messaging used in Steps 4 and 5 is the same conventional messaging used in Steps 4 and 5 in the processing of FIG. 3.

In Step 6, the CBSD 104(1b) analyzes the available CBRS spectrum portions and sends a grant request to the new SAS 102(2) for at least some of that available spectrum. In response, in Step 7, the new SAS accesses its local CPAS database to check whether the CBSD was granted spectrum by a different SAS and determines that the CBSD was granted spectrum by the old SAS 102(1). As such, in Step 8, the new SAS 102(2) sends a CBSD record request to the old SAS 102(1) to determine the spectrum granted by the old SAS to the CBSD 104(1b). In response, in Step 9, the old SAS accesses its local CPAS database to retrieve information about the granted spectrum and sends the new SAS a CBSD record response with that information. In response, in Step 10, the new SAS determines that the granted spectrum is active and matches the spectrum requested by the CBSD. In Step 11, the new SAS sends a grant transfer request to the old SAS for the requested spectrum, and, in response, in Step 12, the old SAS send a positive grant transfer response to the new SAS and updates its local CPAS database to eliminate its own spectrum grant to the CBSD. In Step 13, the new SAS sends a positive grant response to the CBSD confirming the granted spectrum and updates its local CPAS database accordingly. Note that the messaging used in Steps 6 and 13 is the same conventional messaging used in Steps 6 and 7 in the processing of FIG. 3, and the messaging used in Steps 8 and 9 is also conventional messaging, but that the grant transfer request and response messaging using in Steps 11 and 12 is new.

In Step 14, when the CBSD 104(1b) is ready to use the granted spectrum, the CBSD sends a heartbeat message to the new SAS 102(2) indicating that the CBSD is ready to use the granted spectrum. In response, in Step 15, the new SAS sends a heartbeat response to the CBSD indicating that the CBSD is authorized to use the granted spectrum. Note that the messaging used in Steps 14 and 15 is the same conventional messaging used in Steps 8 and 9 in the processing of FIG. 3. Although not represented in FIG. 4, the CBSD 104(1b) begins to use the granted spectrum (for wireless communications with wireless devices (not shown in the figures) within its geographical coverage area) and periodically transmits additional heartbeat messages to inform the new SAS that it is continuing to use that granted spectrum. Note that, at the next daily CPAS procedure, the local CPAS databases at the old and new SASs will be appropriately conformed to one another.

With the new grant transfer request and response messaging of Steps 11 and 12, any GAA spectrum grants by a current SAS can be quickly transferred to a new SAS so that a migrating CBSD will not have to wait a week for the existing GAA spectrum grants to expire at the old SAS before being able to use that same spectrum at the new SAS. Since PAL spectrum grants are also licensed spectrum, in some implementations, the grant transfer request can include the transfer of both GAA spectrum grants and PAL spectrum grants.

Figure 5:
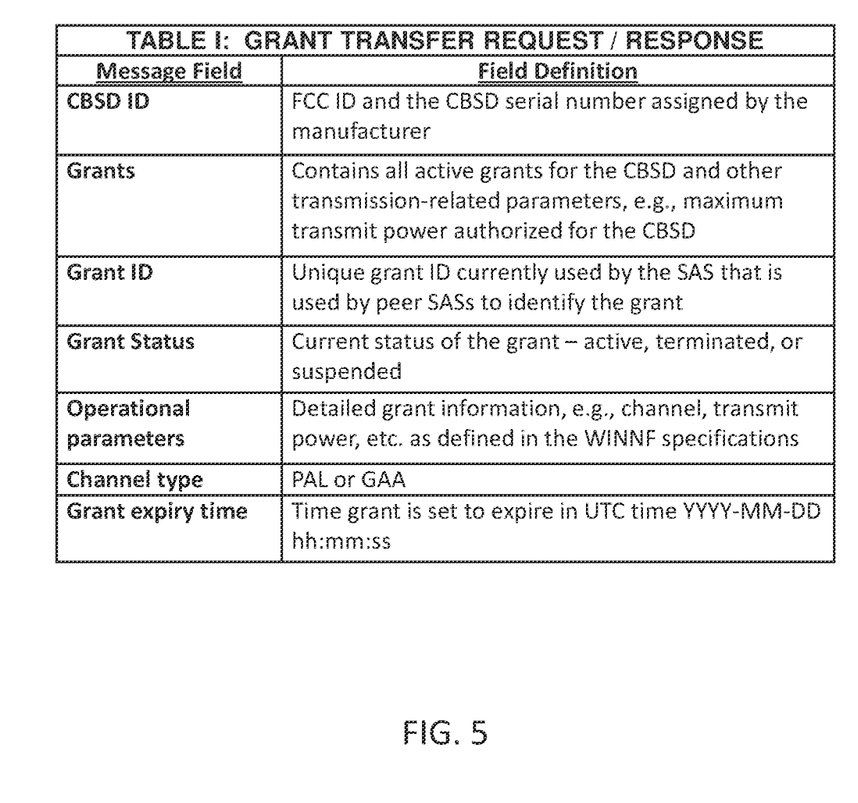
FIG. 5 shows Table I, which identifies the fields that may be included in the new grant transfer request and response messages of FIG. 4.

FIG. 5 shows Table I, which identifies the fields that may be included in the new grant transfer request and response messages of FIG. 4. For a grant transfer request, the requesting CBSD leaves blank any field corresponding to requested information, and the responding SAS includes the requested information in those fields of the corresponding grant transfer response. All of the fields in Table I are also defined in Section 8.3 of the WINNF-TS-0096 Specification.

The processing of FIG. 4 corresponds to a situation in which a single CBSD is migrated from its current SAS to a new SAS. The processing of FIG. 4 can be implemented multiple times to migrate multiple CBSDs from their (one or more) current SASs to (one or more) new SASs. There may be situations in which a service provider decides to transfer all of its CBSDs, or even just a subset of its CBSDs, from the same current SAS to the same new SAS.

Figure 6:
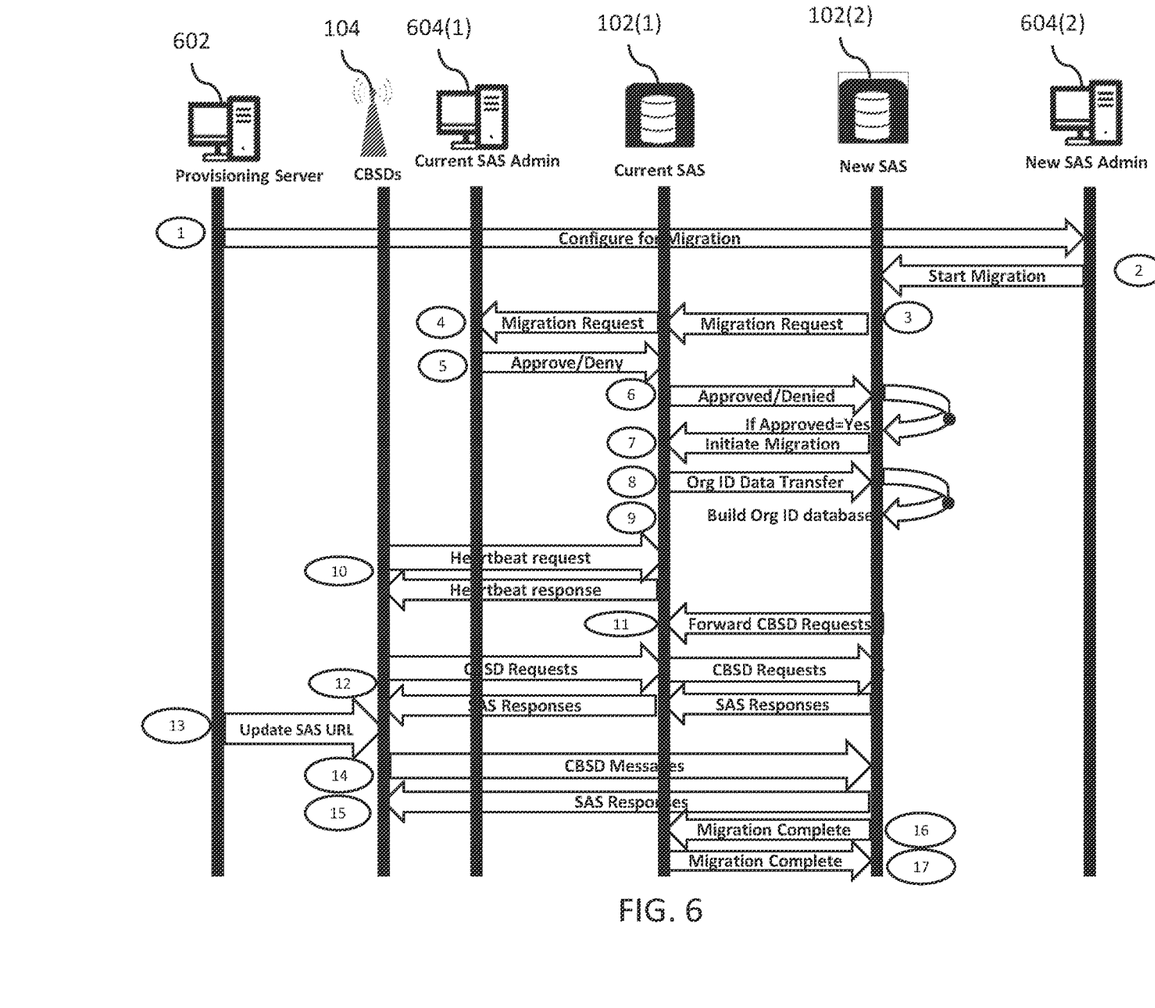
FIG. 6 is a signal flow diagram that represents the processing involved in a service provider migrating a number of its CBSDs from a current SAS to a new SAS.

FIG. 6 is a signal flow diagram that represents the processing involved in a service provider migrating a number of its CBSDs from a current SAS to a new SAS. For example, the processing of FIG. 6 could apply to the first service provider of FIG. 1 migrating the CBSDs 104(1a) and 104(1b) from being associated with the (current) SAS 102(1) to being associated with the (new) SAS 102(2). Note that this diagram corresponds to CBSDs that communicate directly with each SAS. Those skilled in the art will understand how the signal flow would be modified for a CBSD that communicates with a SAS via a domain proxy.

As in FIG. 4, the assumption in FIG. 6 is that each CBSD 104(1a)/104(1b) has already registered with and received one or more spectrum grants from the current SAS 102(1) using the processing of FIG. 3, at least one of which spectrum grants is a GAA spectrum grant, and that the service provider for the CBSDs has decided to migrate (at least) those two CBSDs from being associated with the current SAS 102(1) to being associated with the new SAS 102(2). Furthermore, it is also assumed that, prior to the processing of FIG. 6, the current SAS and the new SAS have participated in the daily inter-SAS CPAS procedure such that each SAS has a local CPAS database identifying the current set of spectrum grants throughout the network 100 of FIG. 1.

Although not represented in FIG. 1, in the network 100, each SAS has its own SAS administrator that is responsible for controlling the operations of the SAS. In FIG. 6, SAS administrator 604(1) is the SAS administrator for the current SAS 102(1), and SAS administrator 604(2) is the SAS administrator for the new SAS 102(2). As depicted in FIG. 6, the SAS administrators 604(1) and 604(2) may be implemented as computer-based nodes in the network 100 that are operated by individuals to communicate with the respective SASs 102(1) and 102(2). When a CBSD of a service provider is initially configured in the network, the CBSD is assigned to a particular SAS and to an organization ID associated with the service provider, where each service provider has one or more organization IDs. The organization IDs enable a service provider to group its CBSD into one or more subsets of CBSDs, where each subset of CBSDs is capable of being collectively migrated from their current SAS to a new SAS. Each SAS in the network is provisioned with mappings from organization IDs to CBSDs for all of the different service providers having CBSDs in the network no matter with which SAS those CBSDs are currently associated.

In the scenario depicted in FIG. 6 for the network 100 of FIG. 1, the first service provider (represented in FIG. 6 by the provisioning server 602) has decided to migrate its CBSDs 104(1a) and 104(1b), which are associated with the same organization ID, from the current SAS 102(1) to the new SAS 102(2). In general, a provisioning server (also known as the element management system (EMS)) is the network configuration manager for the CBSDs of a service provider.

The processing of FIG. 6 starts in Step 1 in which the provisioning server 602 of the first service provider notifies the SAS administrator 604(2) of the new SAS 102(2) for the migration from the current SAS 102(1) to the new SAS 102(2) of the CBSDs associated with a specified organization ID. In response, in Step 2, the SAS administrator 604(2) configures the new SAS 102(2) to initiate the migration of those CBSDs by provisioning information about the current SAS 102(1) and the organization ID of the CBSDs to be migrated to the new SAS 102(2).

In Step 3, the new SAS 102(2) sends a migration request to the current SAS 102(1) identifying the organization ID of the CBSDs to be migrated from the current SAS to the new SAS. In response, in Step 4, the current SAS 102(1) sends a migration request query to the SAS administrator 604 to confirm that the migration request from the new SAS 102(2) is acceptable. In response, in Step 5, the SAS administrator 604 sends a positive or negative response to the current SAS 102(1), and, in response, in Step 6, the current SAS 102(1) sends a positive or negative response to the new SAS 102(2). In the scenario of FIG. 6, the SAS administrator 604 approves the migration request in Step 6.

As such, in Step 7, the new SAS 102(2) sends a message to the current SAS 102(1) to initiate the migration. In response, in Step 8, the current SAS 102(1) transmits information about the migrating CBSDs 104 associated with the identified organization ID to the new SAS 102(2). This information includes information about the existing spectrum grants to each of the migrating CBSDs 104 associated with that organization ID. In Step 9, the new SAS 102(2) organizes the information received from the current SAS 102(1) in Step 8 to be able to support the migrating CBSDs 104.

Meanwhile, the current SAS 102(1) continues to support the migrating CBSDs 104(1a) and 104(1b). This is represented in FIG. 6 by Step 10, where the migrating CBSDs continue to transmit heartbeat request messages to the current SAS 102(1) for each of their spectrum grants and the current SAS 102(1) acknowledges each heartbeat request message with a heartbeat response message back to the corresponding migrating CBSD.

When the new SAS 102(2) is ready to support the migrating CBSDs 104(1a) and 104(1b), in Step 11, the new SAS 102(2) sends a request to the current SAS 102(1) for the current SAS 102(1) to begin to forward all request messages received from the migrating CBSDs to the new SAS 102(2). At that point, the current SAS 102(1) starts functioning as a proxy between the migrating CBSDs and the new SAS 102(2). This is represented in FIG. 6 by Step 12, where (i) each CBSD request message received from a migrating CBSD by the current SAS 102(1) is forwarded by the current SAS 102(1) to the new SAS 102(2) for processing and (ii) each SAS response received from the new SAS 102(2) by the current SAS 102(1) is forwarded by the current SAS 102(1) to the appropriate migrating CBSD for processing.

In Step 13, the service provider's provisioning server 602 updates the SAS URL provisioned at each of the migrating CBSDs 104(1a) and 104(1b) to be the URL of the new SAS 102(2). From then on, each now-migrated CBSD 104(1a)/104(1b) uses the new SAS's URL to transmit its CBSD messages directly to the new SAS 102(2) (represented in FIG. 6 by Step 14), and the new SAS 102(2) transmits its SAS responses directly to the appropriate migrated CBSD (represented in FIG. 6 by Step 15).

In Step 16, the new SAS 102(2) sends a migration complete message to the old SAS 102(1) and, in response, in Step 17, the old SAS 102(1) de-allocates its previous spectrum grants to the migrated CBSDs and sends an acknowledgement message back to the new SAS 102(2).

With the processing of FIG. 6, a service provider can migrate a number of its CBSDs from their current (shared) SAS to a new (shared) SAS in a single process. Alternatively, the service provider could perform the processing of FIG. 4 multiple times, once for each migrating CBSD. Note that, at the next daily CPAS procedure, the local CPAS databases at the old and new SASs will be appropriately conformed to one another.

Note that the messaging of Steps 10 and 12-15 is implemented using conventional messages, while the messaging of Steps 3-8 and 11 is new. In addition, the organizing of the transferred data represented in Step 9 and the ability of a SAS to function as a proxy as represented in Step 12 are also both new. With the new messaging and new functionality, any previously made GAA spectrum grants by an old SAS to a migrating CBSD can be quickly transferred to a new SAS so that the migrating CBSD will not have to wait a week for those GAA spectrum grants to expire at the old SAS before being able to use that same spectrum at the new SAS. As before, since PAL spectrum grants are also licensed spectrum, in some implementations, the transfer of grants can include the transfer of both GAA spectrum grants and PAL spectrum grants.

Figure 7:
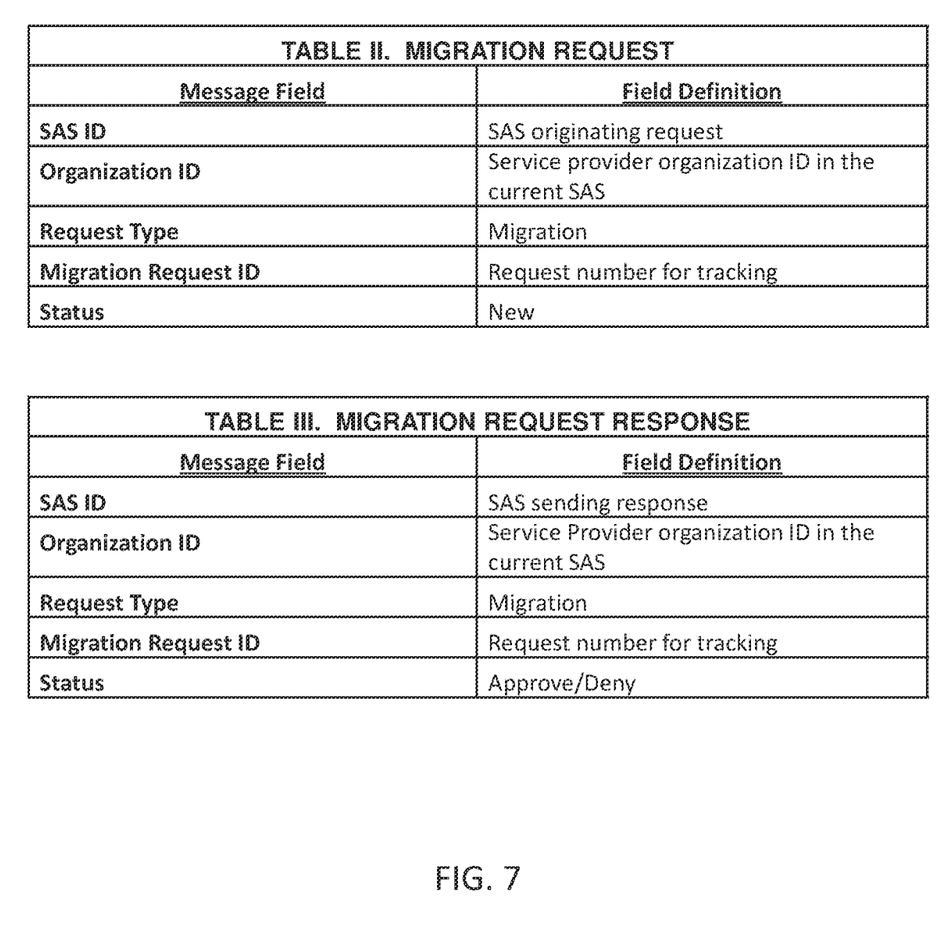
FIG. 7 shows Tables II-VI, which identify the fields that may be included in the new messages of FIG. 6.

FIG. 7 shows Tables II-VI, which identify the fields that may be included in the new messages of FIG. 6. In particular, Table II identifies the fields in the migration request messages of Steps 3 and 4; Table III identifies the fields in the migration request response messages of Steps 5 and 6; Table IV identifies the fields in the initiate migration messages of Step 7; Table V identifies the fields in the forward CBSD requests message of Step 11; and Table VI identifies the fields in the migration complete messages of Steps 16 and 17, where the status is "Complete" in the message of Step 16 and "Acknowledged" in the message of Step 17. For Step 8, the spectrum grant information may be sent using the message format of the grant transfer response of Table I in FIG. 5. All of the fields in Tables II-VI are also defined in Section 8.3 of the WINNF-TS-0096 Specification.

Although the present disclosure has been described in the context of 5G CBRS networks, those skilled in the art will understand that the techniques of the disclosure can also be implemented in the context of other networks, including other 5G networks as well as non-5G networks.

In certain embodiments, the present disclosure is a spectrum access system (SAS) for a wireless communication network. The SAS comprises transceiver equipment configured to communicate with at least one other SAS and at least one wireless service device (SD); a processor configured to control operations of the transceiver equipment; and memory configured to store code and/or data for the processor. The processor is configured to control the SAS to participate in migration of at least one SD from the SAS to a new SAS, and the SAS is configured to transfer at least one existing spectrum grant of the at least one SD to the new SAS for the migration without waiting for a timer associated with the existing spectrum grant to expire.

In at least some of the above embodiments, the SAS is a spectrum access system for a Citizens Broadband Radio Service (CBRS) network; the at least one SD is a CBRS service device (CBSD); and the at least one spectrum grant comprises at least one Priority Access License (PAL) and/or at least one General Authorized Access (GAA) license.

In at least some of the above embodiments, the new SAS is configured to receive a request to transfer each existing spectrum grant for a single, specified SD from the current SAS to the new SAS; and the current SAS is configured to transfer each existing spectrum grant for the single, specified SD from the current SAS to the new SAS.

In at least some of the above embodiments, the new SAS is configured to receive a request to transfer each existing spectrum grant for a plurality of specified SDs from the current SAS to the new SAS; and the current SAS is configured to transfer each existing spectrum grant for the plurality of specified SDs from the current SAS to the new SAS.

In at least some of the above embodiments, the SAS is configured to identify the plurality of specified SDs using a shared organization ID.

In at least some of the above embodiments, the new SAS is configured to receive an instruction from the current SAS to function as a proxy between the at least one SD and the new SAS in which the current SAS is configured to forward (i) messages received from the at least one SD to the new SAS and (ii) messages received from the new SAS to the at least one SD.

In certain embodiments, the present disclosure is a SAS for a wireless communication network. The SAS comprises transceiver equipment configured to communicate with at least one other SAS and at least one wireless SD; a processor configured to control operations of the transceiver equipment; and memory configured to store code and/or data for the processor. The processor is configured to control the SAS to participate in migration of at least one SD from a current SAS to the SAS, and the SAS is configured to request transfer of at least one existing spectrum grant of the at least one SD from the current SAS for the migration without waiting for a timer associated with the existing spectrum grant to expire.

In at least some of the above embodiments, the SAS is a spectrum access system for a CBRS network; the at least one SD is a CBSD; and the at least one spectrum grant comprises at least one PAL and/or at least one GAA license.

In at least some of the above embodiments, the SAS is configured to request transfer of each existing spectrum grant for a single, specified SD from the current SAS to the SAS; and the SAS is configured to receive each existing spectrum grant for the single, specified SD from the current SAS.

In at least some of the above embodiments, the SAS is configured to request transfer of each existing spectrum grant for a plurality of specified SDs from the current SAS to the SAS; and the SAS is configured to receive each existing spectrum grant for the plurality of specified SDs from the current SAS.

In at least some of the above embodiments, the SAS is configured to identify the plurality of specified SDs using a shared organization ID.

In at least some of the above embodiments, the SAS is configured to instruct the current SAS to function as a proxy between the at least one SD and the SAS.

Embodiments of the disclosure may be implemented as (analog, digital, or a hybrid of both analog and digital) circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, micro-controller, general-purpose computer, or other processor.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present disclosure may take the form of an entirely software-based embodiment (including firmware, resident software, micro-code, and the like), an entirely hardware embodiment, or an embodiment combining software and hardware aspects that may generally be referred to herein as a "system."

Embodiments of the disclosure can be manifest in the form of methods and apparatuses for practicing those methods. Embodiments of the disclosure can also be manifest in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the disclosure. Embodiments of the disclosure can also be manifest in the form of program code, for example, stored in a non-transitory machine-readable storage medium including being loaded into and/or executed by a machine, wherein, when the program code is loaded into and executed by a machine, such as a computer, the machine becomes an apparatus for practicing the disclosure. When implemented on a general-purpose processor, the program code segments combine with the processor to provide a unique device that operates analogously to specific logic circuits.

Any suitable processor-usable/readable or computer-usable/readable storage medium may be utilized. The storage medium may be (without limitation) an electronic, magnetic, optical, electromagnetic, infrared, or semiconductor system, apparatus, or device. A more-specific, non-exhaustive list of possible storage media include a magnetic tape, a portable computer diskette, a hard disk, a random access memory (RAM), a read-only memory (ROM), an erasable programmable read-only memory (EPROM) or Flash memory, a portable compact disc read-only memory (CD-ROM), an optical storage device, and a magnetic storage device. Note that the storage medium could even be paper or another suitable medium upon which the program is printed, since the program can be electronically captured via, for instance, optical scanning of the printing, then compiled, interpreted, or otherwise processed in a suitable manner including but not limited to optical character recognition, if necessary, and then stored in a processor or computer memory. In the context of this disclosure, a suitable storage medium may be any medium that can contain or store a program for use by or in connection with an instruction execution system, apparatus, or device.

The functions of the various elements shown in the figures, including any functional blocks labeled as "processors," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those of ordinary skill in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

It will be further understood that various changes in the details, materials, and arrangements of the parts which have been described and illustrated in order to explain embodiments of this disclosure may be made by those skilled in the art without departing from embodiments of the disclosure encompassed by the following claims.

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the disclosure.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

All documents mentioned herein are hereby incorporated by reference in their entirety or alternatively to provide the disclosure for which they were specifically relied upon.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

As used herein and in the claims, the term "provide" with respect to an apparatus or with respect to a system, device, or component encompasses designing or fabricating the apparatus, system, device, or component; causing the apparatus, system, device, or component to be designed or fabricated; and/or obtaining the apparatus, system, device, or component by purchase, lease, rental, or other contractual arrangement.

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

What is claimed is:

1. A spectrum access system (SAS) for a wireless communication network, the SAS comprising:
    transceiver equipment configured to communicate with at least one other SAS and at least one wireless service device (SD);
    a processor configured to control operations of the transceiver equipment; and
    memory configured to store code and/or data for the processor, wherein:
    the processor is configured to control the SAS to participate in migration of at least one SD from the SAS to a new SAS; and
    the SAS is configured to transfer at least one existing spectrum grant of the at least one SD, wherein:
        the at least one existing spectrum grant has an associated de-allocation timer; and
        the SAS is configured to transfer the at least one existing spectrum grant to the new SAS for the migration without waiting for the associated de-allocation timer associated with the existing spectrum grant to expire.

2. The SAS of claim 1, wherein:
    the SAS is a spectrum access system for a Citizens Broadband Radio Service (CBRS) network;
    the at least one SD is a CBRS service device (CBSD); and
    the at least one spectrum grant comprises at least one Priority Access License (PAL) and/or at least one General Authorized Access (GAA) license.

3. The SAS of claim 1, wherein:
the SAS is configured to receive a request to transfer each existing spectrum grant for a single, specified SD from the SAS to the new SAS; and
the SAS is configured to transfer each existing spectrum grant for the single, specified SD to the new SAS.

4. The SAS of claim 1, wherein:
the SAS is configured to receive a request to transfer each existing spectrum grant for a plurality of specified SDs from the SAS to the new SAS; and
the SAS is configured to transfer each existing spectrum grant for the plurality of specified SDs to the new SAS.

5. The SAS of claim 4, wherein the SAS is configured to identify the plurality of specified SDs using a shared organization ID.

6. The SAS of claim 1, wherein the SAS is configured to receive an instruction from the new SAS to function as a proxy between the at least one SD and the new SAS in which the SAS is configured to forward (i) messages received from the at least one SD to the new SAS and (ii) messages received from the new SAS to the at least one SD.

7. A method for a SAS for a wireless communication network, the method comprising:
the SAS participating in migration of at least one SD from the SAS to a new SAS; and
the SAS transferring at least one existing spectrum grant of the at least one SD, wherein:
the at least one existing spectrum grant has an associated de-allocation timer; and
the SAS transfers the at least one existing spectrum grant to the new SAS for the migration without waiting for a-the associated de-allocation timer associated with the existing spectrum grant to expire.

8. The method of claim 7, wherein:
the SAS is a spectrum access system for a CBRS network;
the at least one SD is a CBSD; and
the at least one spectrum grant comprises at least one PAL license and/or at least one GAA license.

9. The method of claim 7, wherein:
the SAS receives a request to transfer each existing spectrum grant for a single, specified SD from the SAS to the new SAS; and
the SAS transfers each existing spectrum grant for the single, specified SD to the new SAS.

10. The method of claim 7, wherein:
the SAS receives a request to transfer each existing spectrum grant for a plurality of specified SDs from the SAS to the new SAS; and
the SAS transfers each existing spectrum grant for the plurality of specified SDs to the new SAS.

11. The method of claim 10, wherein the SAS identifies the plurality of specified SDs using a shared organization ID.

12. The method of claim 7, wherein the SAS receives an instruction from the new SAS to function as a proxy between the at least one SD and the new SAS in which the SAS forwards (i) messages received from the at least one SD to the new SAS and (ii) messages received from the new SAS to the at least one SD.

13. A SAS for a wireless communication network, the SAS comprising:
transceiver equipment configured to communicate with at least one other SAS and at least one wireless SD;
a processor configured to control operations of the transceiver equipment; and
memory configured to store code and/or data for the processor, wherein:
the processor is configured to control the SAS to participate in migration of at least one SD from a current SAS to the SAS; and
the SAS is configured to request transfer of at least one existing spectrum grant of the at least one SD, wherein:
the at least one existing spectrum grant has an associated de-allocation timer; and
the SAS is configured to request the transfer of the at least one existing spectrum grant from the current SAS for the migration without waiting for the associated de-allocation timer associated with the existing spectrum grant to expire.

14. The SAS of claim 13, wherein:
the SAS is a spectrum access system for a CBRS network;
the at least one SD is a CBSD; and
the at least one spectrum grant comprises at least one PAL and/or at least one GAA license.

15. The SAS of claim 13, wherein:
the SAS is configured to request transfer of each existing spectrum grant for a single, specified SD from the current SAS to the SAS; and
the SAS is configured to receive each existing spectrum grant for the single, specified SD from the current SAS.

16. The SAS of claim 13, wherein:
the SAS is configured to request transfer of each existing spectrum grant for a plurality of specified SDs from the current SAS to the SAS; and
the SAS is configured to receive each existing spectrum grant for the plurality of specified SDs from the current SAS.

17. The SAS of claim 16, wherein the SAS is configured to identify the plurality of specified SDs using a shared organization ID.

18. The SAS of claim 13, wherein the SAS is configured to instruct the current SAS to function as a proxy between the at least one SD and the SAS.

19. A method for a SAS for a wireless communication network, the method comprising:
the SAS participating in migration of at least one SD from a current SAS to the SAS; and
the SAS receiving at least one existing spectrum grant of the at least one SD, wherein:
the at least one existing spectrum grant has an associated de-allocation timer; and
the SAS requests the transfer of the at least one existing spectrum grant from the current SAS for the migration without waiting for the associated de-allocation timer associated with the existing spectrum grant to expire.

20. The method of claim 19, wherein:
the SAS is a spectrum access system for a CBRS network;
the at least one SD is a CBSD; and
the at least one spectrum grant comprises at least one PAL license and/or at least one GAA license.

21. The method of claim 19, wherein:
the SAS requests transfer of each existing spectrum grant for a single, specified SD from the current SAS to the SAS; and
the SAS receives each existing spectrum grant for the single, specified SD from the current SAS.

22. The method of claim 19, wherein:
the SAS requests transfer of each existing spectrum grant for a plurality of specified SDs from the current SAS to the SAS; and
the SAS receives each existing spectrum grant for the plurality of specified SDs from the current SAS.

23. The method of claim 22, wherein the SAS identifies the plurality of specified SDs using a shared organization ID.

24. The method of claim 19, wherein the SAS instructs the current SAS to function as a proxy between the at least one SD and the SAS.

25. The SAS of claim 1, wherein the migration is started by a SAS administrator with no direct involvement from the at least one SD.

26. The method of claim 7, wherein the migration is started by a SAS administrator with no direct involvement from the at least one SD.

27. The SAS of claim 13, wherein the migration is started by a SAS administrator with no direct involvement from the at least one SD.

28. The method of claim 19, wherein the migration is started by a SAS administrator with no direct involvement from the at least one SD.

29. The SAS of claim 6, wherein, upon receiving a message from the new SAS that the migration has been completed, the SAS is configured to cease functioning as the proxy between the at least one SD and the new SAS without receiving a subsequent message from the at least one SD.

30. The method of claim 12, wherein, upon receiving a message from the new SAS that the migration has been completed, the SAS ceases functioning as the proxy between the at least one SD and the new SAS without receiving a subsequent message from the at least one SD.

* * * * *